(12) United States Patent
Worden et al.

(10) Patent No.: US 12,463,583 B2
(45) Date of Patent: Nov. 4, 2025

(54) SOLAR PANEL MODULE CLAMP WITH GUSSETS

(71) Applicant: Gamechange Solar Corp., Norwalk, CT (US)

(72) Inventors: Andrew Barron Worden, Greenwich, CT (US); Jacob Grant, Springfield, MA (US); Zachary Cutting, Westminster, MA (US)

(73) Assignee: GAMECHANGE SOLAR CORP., Norwalk, CT (US)

( * ) Notice: Subject to any disclaimer, the term of this patent is extended or adjusted under 35 U.S.C. 154(b) by 0 days.

(21) Appl. No.: 18/791,864

(22) Filed: Aug. 1, 2024

(65) Prior Publication Data

US 2025/0226789 A1 Jul. 10, 2025

Related U.S. Application Data

(60) Provisional application No. 63/545,162, filed on Oct. 21, 2023, provisional application No. 63/530,606, filed on Aug. 3, 2023.

(51) Int. Cl.
*H02S 20/32* (2014.01)
*H02S 30/10* (2014.01)

(52) U.S. Cl.
CPC ............. *H02S 20/32* (2014.12); *H02S 30/10* (2014.12)

(58) Field of Classification Search
CPC ................................ H02S 20/32; H02S 30/10
See application file for complete search history.

(56) References Cited

U.S. PATENT DOCUMENTS

| | | | | |
|---|---|---|---|---|
| 3,982,373 | A * | 9/1976 | Wilson | E04D 3/363 52/522 |
| 4,406,505 | A * | 9/1983 | Avramovich | H01R 4/64 439/97 |
| 4,715,741 | A * | 12/1987 | Kulbersh | F16B 7/22 403/399 |
| 8,701,372 | B2 * | 4/2014 | Nuernberger | E04F 19/06 52/173.3 |
| 10,605,489 | B2 * | 3/2020 | Worden | F24S 30/425 |

(Continued)

*Primary Examiner* — Angelo Trivisonno (57) ABSTRACT

A photovoltaic module clamp that secures a photovoltaic module to a structural support surface comprises a web that separates a first sidewall and a second sidewall at a distal end of the clamp, where the first and second sidewalls are substantially opposing and spaced apart to form a cavity. The web includes a plurality of segments includes a plurality of radiused segments and first and second opposing gussets located on respective opposing ones of the plurality of radiused segments. The first sidewall includes a through hole that receives a projection extending from the structural support surface. The second sidewall includes a rib extending from a proximate end of the second sidewall towards the distal end of the clamp, and the proximate end of the second sidewall flares outwardly from the cavity. The first sidewall has a first sidewall length extending along the first sidewall between the proximate and distal ends that is greater than a second sidewall length of the second sidewall extending along the second sidewall between the proximate and distal ends. A bendable projection extends from the first sidewall through the through hole and into the cavity.

10 Claims, 6 Drawing Sheets

(56) References Cited

U.S. PATENT DOCUMENTS

| | | | |
|---|---|---|---|
| 2011/0265860 A1* | 11/2011 | Ciasulli | F24S 25/634 174/126.1 |
| 2012/0192925 A1* | 8/2012 | Grushkowitz | H10F 19/90 136/251 |
| 2013/0139870 A1* | 6/2013 | Nuernberger | F24S 25/634 136/251 |
| 2014/0182678 A1* | 7/2014 | Chiu | H02S 30/10 24/458 |
| 2022/0407451 A1 | 12/2022 | Jacobs | |

* cited by examiner

SOLAR PANEL MODULE CLAMP WITH GUSSETS

CROSS REFERENCE TO RELATED APPLICATIONS

This application claims the benefit of U.S. Provisional Patent Application Ser. No. 63/530,606 filed Aug. 3, 2023 and U.S. Provisional Patent Application Ser. No. 63/545,162 filed Oct. 21, 2023, both of which are hereby incorporated by reference.

BACKGROUND OF THE INVENTION

1. Technical Field

This disclosure relates generally to a solar panel installation and, more particularly, to apparatuses and assemblies for use in a solar panel installation.

2. Background Information

To fasten the solar panels to a mount (e.g., a tracker or fixed tilt), various systems, mounting brackets, clamps and other fasteners exist. In utility a scale solar power plant not only must the system for mounting photovoltaic panels be secure and rugged, but the system must also be relatively easy and quick to install.

There is a need for an improved assembly for mounting a photovoltaic module.

SUMMARY OF THE DISCLOSURE

According to an aspect of the present disclosure, a photovoltaic module clamp that secures a photovoltaic module to a structural support surface includes a web that separates a first sidewall and a second sidewall at a distal end of the clamp, where the first and second sidewalls are substantially opposing and spaced apart to form a cavity. The web includes a plurality of segments including a plurality of radiused segments and first and second opposing gussets located on respective opposing ones of the plurality of radiused segments. The first sidewall includes a through hole that receives a projection extending from the structural support surface. The second sidewall includes a rib extending from a proximate end of the second sidewall towards the distal end of the clamp, and the proximate end of the second sidewall flares outwardly from the cavity. The first sidewall has a first sidewall length extending along the first sidewall between the proximate and distal ends that is greater than a second sidewall length of the second sidewall extending along the second sidewall between the proximate and distal ends. A bendable projection extends from the first sidewall through the through hole and into the cavity.

The web, the first and second sidewalls and the bendable projection may form a unitary single piece structure.

The unitary single piece structure may be metallic.

The web may be a bulbous shape that includes the first and second opposing gussets.

The through hole may be rectangularly shaped.

The proximate ends of the second sidewall may be one of chamfered or bullnosed.

According to another aspect of the present disclosure, a photovoltaic module clamp comprises a web extending between a first sidewall and a second sidewall at a distal end of the clamp, where the first and second sidewalls are substantially opposing and spaced apart to form a cavity. The web includes a plurality of segments including a plurality of radiused segments and first and second opposing gussets located on respective opposing ones of the plurality of radiused segments. The first sidewall includes a bendable projection extending obliquely from the first sidewall and the second sidewall includes a rib extending from a proximate end of the second sidewall towards the distal end of the clamp. The proximate end of the second sidewall flares outwardly away from the cavity. The first sidewall has a first sidewall length extending along the first sidewall between the proximate and distal ends that is greater than a second sidewall length of the second sidewall extending along the second sidewall between the proximate and distal ends.

According to yet another aspect of the present disclosure, a solar panel mounting subassembly includes a tube, a purlin, a photovoltaic module and a clamp. The purlin is attached to the tube and the purlin included a purlin sidewall with a projection extending outwardly from the sidewall. The photovoltaic module included a frame that includes an exterior mounting hole. A clamp secures the photovoltaic module to the purlin. The clamp includes a web extending between a first sidewall and a second sidewall at a distal end of the clamp, where the first and second sidewalls are substantially opposing and spaced apart to form a cavity. The web includes a plurality of segments including a plurality of radiused segments and first and second opposing gussets located on respective opposing ones of the plurality of radiused segments. The first sidewall includes a through hole and a bendable projection extending obliquely from a plane of the through hole. The second sidewall includes a rib extending from a proximate end of the second sidewall towards the distal end of the clamp, and the proximate end of the second sidewall flares outwardly away from the cavity.

The proximate end of the second sidewall may include a proximate end segment that flares outwardly from the cavity.

The foregoing features and the operation of the invention will become more apparent in light of the following description and the accompanying drawings.

DETAILED DESCRIPTION

Figure 1:
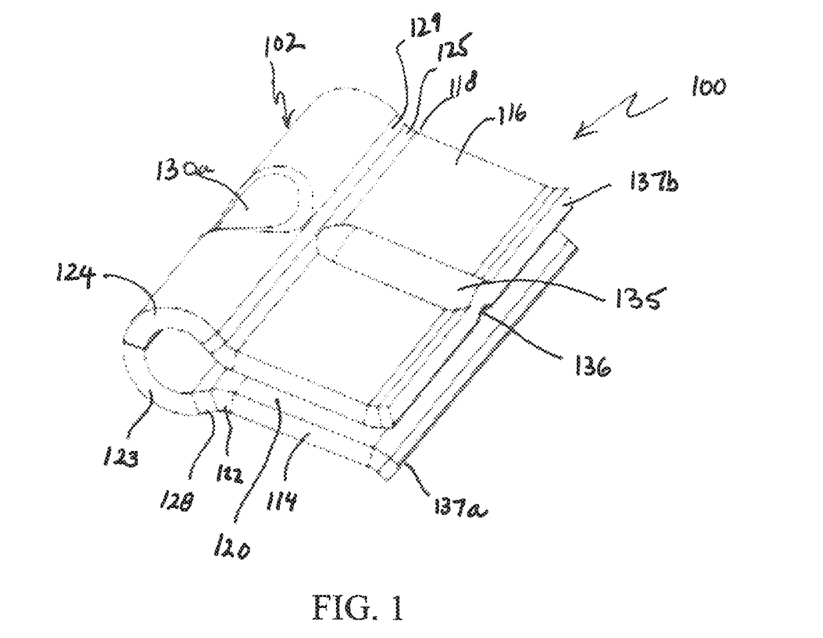
FIG. 1 is a first perspective view of a photovoltaic module clamp.
Figure 2:
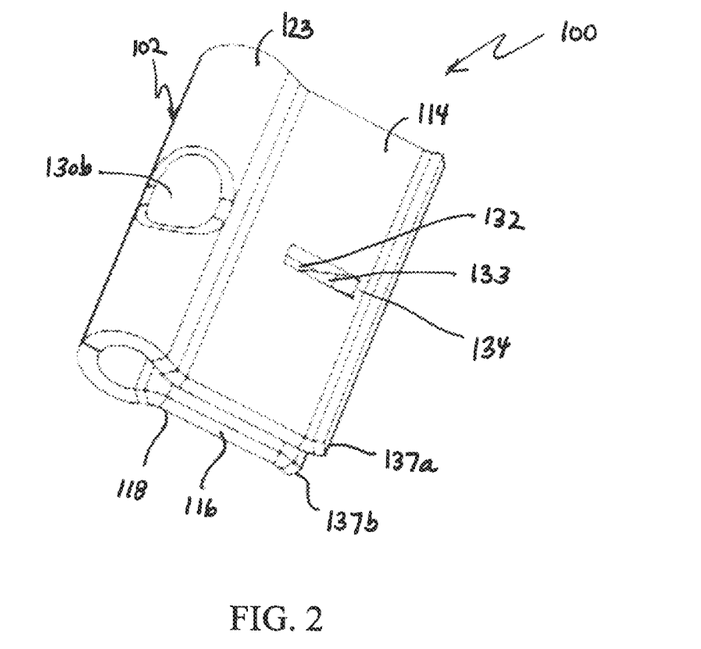
FIG. 2 is a second perspective view of the clamp of FIG. 2.
Figure 3:
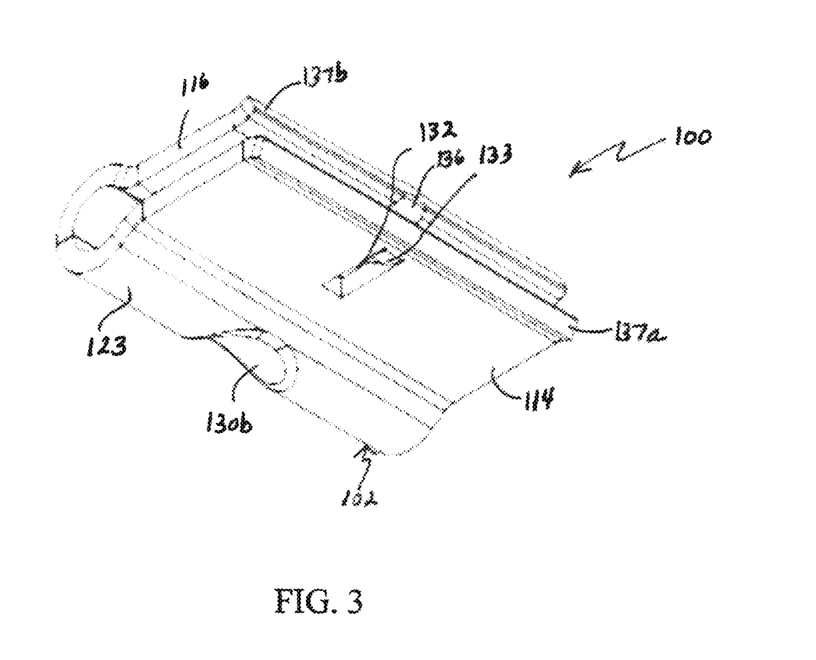
FIG. 3 is a third perspective view of the clamp of FIGS. 1-2.
Figure 4:
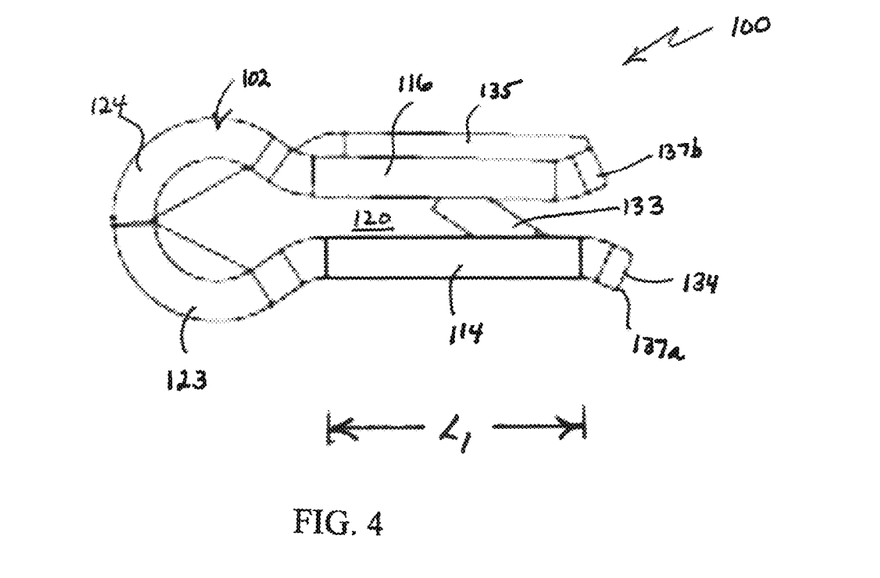
FIG. 4 is a side view of the clamp of FIGS. 1-3.
Figure 5:
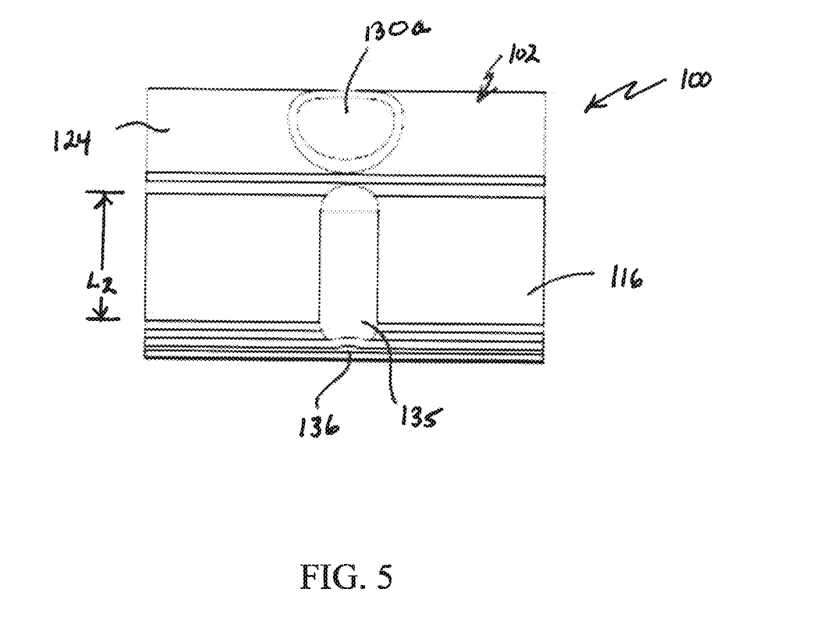
FIG. 5 is a top view of the clamp of FIGS. 1-4.
Figure 6:
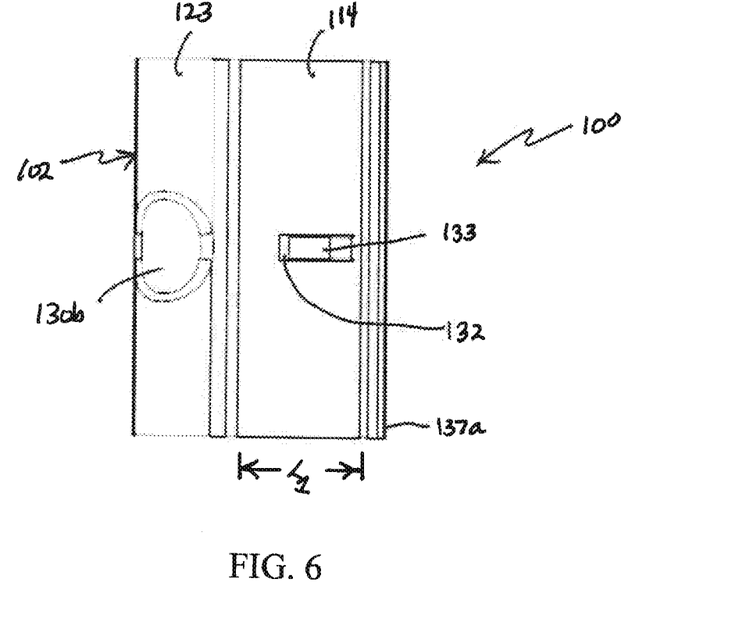
FIG. 6 is a bottom view of the clamp of FIGS. 1-5.
Figure 7:
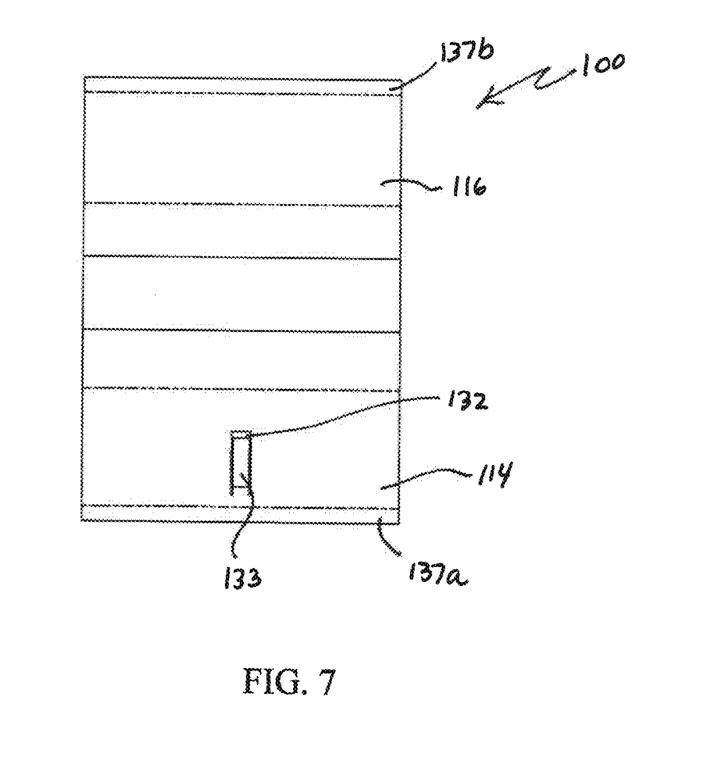
FIG. 7 is a flat view of the clamp of FIGS. 1-6.

FIG. 1 is a first perspective view of a photovoltaic module clamp 100. FIG. 2 is a second perspective view of the clamp of FIG. 1. FIG. 3 is a third perspective view of the clamp of FIGS. 1-2. FIG. 4 is a side view of the clamp of FIGS. 1-3. FIG. 5 is a top view of the clamp of FIGS. 1-4. FIG. 6 is a bottom view of the clamp of FIGS. 1-5. FIG. 7 is a flat view of the clamp of FIGS. 1-6. Referring to FIGS. 1-7, the photovoltaic module clamp 100 secures a photovoltaic (PV) module/solar panel to a structural support surface, such as a purlin, which is attached to a tube (e.g., a torque tube) of a solar racking system. The racking system may be a tracker or fixed tilt system. The clamp 100 includes a web 102 that separates a first sidewall 114 and a second sidewall 116 at a distal end 118. In an exemplary embodiment, the first and second sidewalls 114, 116 are substantially opposing and spaced apart to form a cavity 120. The web 102 includes a plurality of segments, for example including a plurality of radiused segments 122-125 and a plurality of non-radiused (e.g., linear) segments 128-129. The web 102 may be substantially bulbous. It is contemplated the web 102 may take on various shapes that ensure during loading the clamp does not open up.

The photovoltaic module clamp 100 includes gussets 130a, 130b. In this exemplary embodiment the gussets help to prevent opening (e.g., separation of the first and second sidewalls 114, 116) during heavy load.

The first sidewall 114 includes a first through hole 132 that includes a clamp projection 133 extending from a proximate end 134 of the first through hole 132. The clamp projection 133 may be formed by stamping (e.g., metal stamping). In an exemplary embodiment, the first through hole 132 may be substantially rectangular. However, it is contemplated the hole 132 may be one of various shapes. The bendable clamp projection 133 extends obliquely from the first sidewall 114 into the cavity 120. Operation of the clamp projection 133 shall discussed below in more detail.

The second sidewall 116 includes a rib 135 extending between the distal and proximate ends of the clamp. The rib 135 may be radiused outwardly from the exterior surface of the second sidewall 116 and used to position the clamp 100 relative to a purlin, which may include a finger extending from a support surface of the purlin. Similarly, the portion of the interior surface of the second sidewall 116 associated with the rib 135 may also be radiused outwardly perpendicular to the interior and exterior surfaces of the second sidewall to a form a guide trough 136 extending between the distal and proximate ends 118, 134, respectively.

The proximate end of the first sidewall 114 includes a proximate end segment 137a that flares outwardly from the cavity 20. The proximate end of the second sidewall 116 also includes a proximate end segment 137b that flares outwardly from the cavity 20.

The first sidewall 114 has a length $L_1$ extending along the first sidewall between its distal and proximate ends 118, 134, and is greater than a length L2 of the second sidewall 116 extending along the second sidewall between the proximate and distal ends 118, 134. In an exemplary embodiment the first sidewall 114 is adjacent to the purlin and the second sidewall 116 is adjacent to the photovoltaic module frame. This shall be discussed below with respect to FIGS. 8 and 9.

The web 102, the first and second sidewalls 114, 116 and the clamp projection 133 may form a unitary (e.g., single-piece) structure, as shown in FIG. 7, which illustrates a flat view of the clamp 100. In an exemplary embodiment the clamp 100 is metallic. However, again it is contemplated that the clamp may be semi-metallic or non-metallic.

Figure 8:
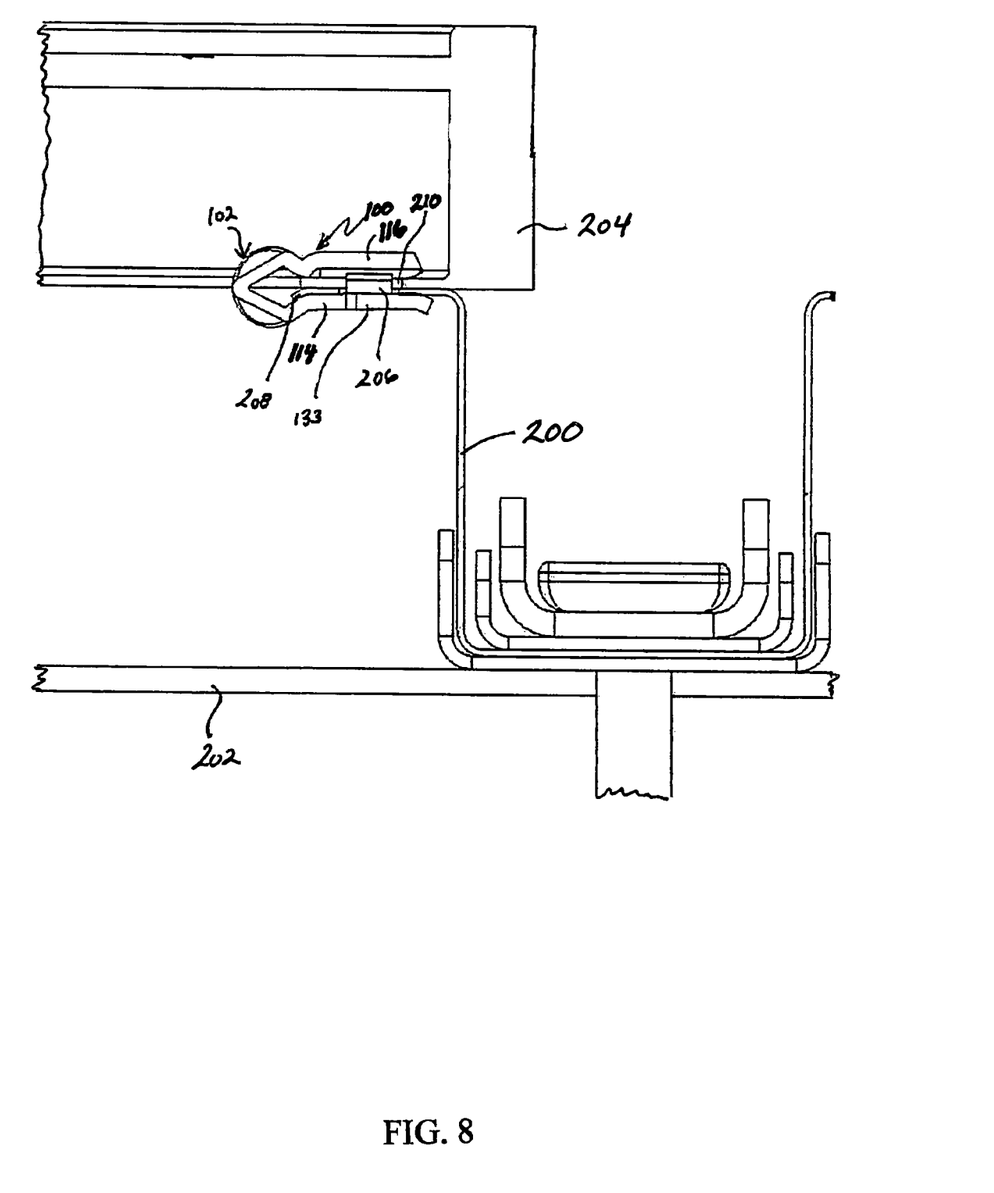
FIG. 8 is a first simplified cross sectional illustration of a solar panel mounting subassembly that includes a purlin, photovoltaic module and the clamp of FIGS. 1-7 an open position attached to the photovoltaic module and the purlin.

FIG. 8 is a first simplified cross sectional illustration of a solar panel mounting subassembly that includes a purlin 200, photovoltaic module 204 and the clamp 100 of FIGS. 1-7 in an open position attached to the photovoltaic module 204 and the purlin 200. The purlin 200 is mounted to a tube 202 (e.g., a torque tube) and the photovoltaic module 204 is attached to the purlin 200 by the clamp 100. The purlin 200 includes a finger 206 that extends from a support surface 208 of the purlin flange and fits into a slot 210 of the photovoltaic module 204 frame. The solar panel mounting subassembly may be part of a single-axis solar tracker, a dual-axis solar tracker or a fixed tilt system. An example of a popular single-axis solar tracker that includes a torque tube and purlins is disclosed in U.S. Pat. No. 10,605,489 entitled "Apparatuses and Assemblies for Solar Panel Installation", assigned to the assignee of the present application.

Referring to FIGS. 1-8, to secure a photovoltaic module to the structural support surface (e.g., a purlin), starting with the photovoltaic module positioned on the purlin with the finger 206 extending through the slot of the photovoltaic module 204 frame as shown in FIG. 8, the clamp 100 is pushed along the longitudinal center line of the rib 135 to apply an installation force $F_I$. This causes the finger 206 of the purlin to slide along the guide trough 136 of the rib 135. Once longitudinally positioned a crimping tool is used to bend the clamp projection 133 inward so the clamp projection 133 passes through the slot 210 of the photovoltaic module 204 and into the guide trough 136 of the rib 135.

Figure 9:
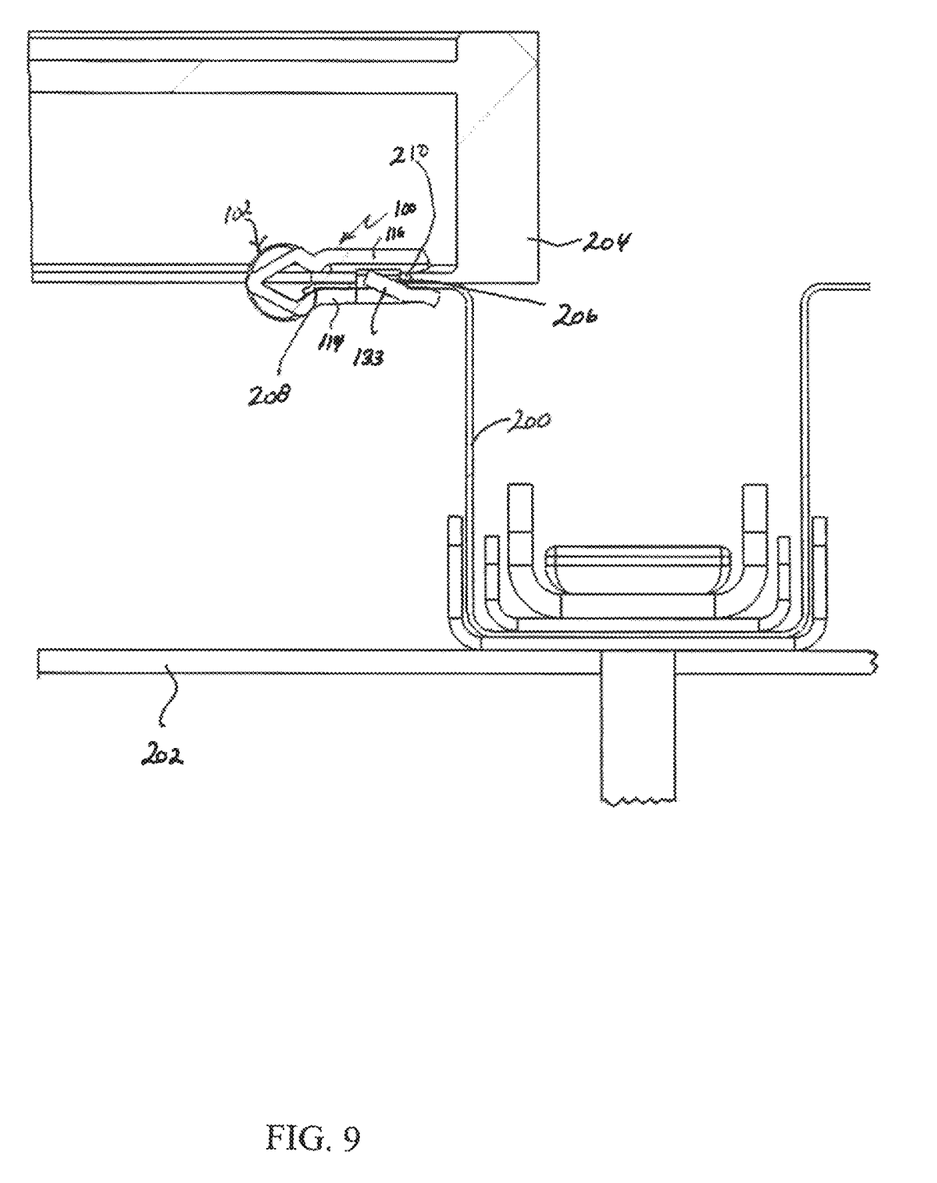
FIG. 9 is a simplified cross sectional illustration of a solar panel mounting subassembly that includes a purlin, photovoltaic module and the clamp of FIGS. 1-7 in a closed position attached to the photovoltaic module and the purlin.

FIG. 9 is a simplified cross-sectional illustration of a solar panel mounting subassembly that includes a purlin, photovoltaic module and the clamp of FIGS. 1-7 in a closed position (e.g., the clamp projection 133 inward so the clamp projection 133 passes through the slot 210 of the photovoltaic module 204 and into the guide trough 136 of the rib 135). With the clamp projection 133 now extending through the slot 210 of the photovoltaic module 204 and into the guide trough 136 of the rib 135, the photovoltaic module 204 is firmly positioned on the purlin 200.

It is contemplated that at least one of the clamp projection 133 and the finger 206 may include punched teeth so the clamp bites into the finger, or visa versa, for grounding.

To remove the clamp 100, the clamp projection 133 is bent back.

The clamp allows an installer to quickly, safely and easily secure a PV module to a support structure (e.g., a purlin). The clamp can be installed by hand, without the need of a tool, for ease of installation. However, it is of course contemplated that a tool may be used.

Although the subject matter has been described in language specific to structural features or methodological acts, it is to be understood that the subject matter defined in the appended claims is not necessarily limited to the specific features and acts described above. Rather, the specific features and acts described above are disclosed as example forms of implementing at least one of the claims.

Various operations of embodiments are provided herein. The order in which some or all of the operations described should not be construed to imply that these operations are necessarily order dependent. Alternatively ordering will be appreciated having the benefit of this description. Further it will be understood that not all operations are necessarily present in each embodiment provided herein. Also it will be understood that not all operations are necessary in some embodiments.

Many modifications may be made to the current invention without departing from the scope or spirit of the claimed subject matter. Unless specified otherwise, "first," "second," or the like are not intended to imply a temporal aspect, a spatial aspect, an ordering etc. Rather such terms are merely used as identifiers names etc. for features, elements, items etc. for features, elements, items, etc. For example, a first location and a second location correspond to location A and location B or two different or two identical locations or the same location.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are to be construed to mean "one or more" unless specified otherwise or clear from context to be directed to a singular form. Also, at least one of A and B or the like means A or B or both A and B. Furthermore, to the extent that "includes", "having", "has", "with", or variants thereof are used in either the detailed description or the claims, such terms are intended to be inclusive in a manner similar to "comprising".

Also, although the disclosure has been illustrated and described with respect to one or more implementations, equivalent alternations and modifications will occur to others skilled in the art based upon reading and understanding of this specification and the annexed drawings. The disclosure includes all such modifications and alterations and is limited only by the scope of the following claims. In particular regard to the various functions performed by the above-described components (e.g., elements, resources, etc.), the terms used to describe the components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one or several implementations, such feature may be combined with one or more other features of the other implementations as may be desired and advantageous for any given or particular application.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. A photovoltaic module clamp that secures a photovoltaic module to a structural support surface, the clamp comprising:
   a web that separates a first sidewall and a second sidewall at a distal end of the clamp, where the first and second sidewalls are substantially opposing and spaced apart to form a cavity;
   where the web includes a plurality of segments comprising a plurality of radiused segments and first and second opposing gussets located on respective opposing ones of the plurality of radiused segments;
   where the first sidewall includes a through hole that receives a projection extending from the structural support surface;
   where the second sidewall includes a rib extending from a proximate end of the second sidewall towards the distal end of the clamp, and the proximate end of the second sidewall flares outwardly from the cavity;
   where the first sidewall has a first sidewall length extending along the first sidewall between the proximate and distal ends that is greater than a second sidewall length of the second sidewall extending along the second sidewall between the proximate and distal ends; and
   a bendable projection extending from the first sidewall through the through hole and into the cavity.

2. The photovoltaic module clamp of claim 1, where the web, the first and second sidewalls and the bendable projection form a unitary single piece structure.

3. The photovoltaic module clamp of claim 2, where the unitary single piece structure is metallic.

4. The photovoltaic module clamp of claim 3, where the web is a bulbous shape that includes the first and second opposing gussets.

5. The photovoltaic modular clamp of claim 4, where the through hole is rectangularly shaped.

6. The photovoltaic modular clamp of claim 5, where the proximate ends of the second sidewall are one of chamfered or bullnosed.

7. A photovoltaic module clamp, comprising:
   a web extending between a first sidewall and a second sidewall at a distal end of the clamp, where the first and second sidewalls are substantially opposing and spaced apart to form a cavity;
   where the web includes a plurality of segments comprising a plurality of radiused segments and first and second opposing gussets located on respective opposing ones of the plurality of radiused segments;
   where the first sidewall includes a bendable projection extending obliquely from the first sidewall;
   where the second sidewall includes a rib extending from a proximate end of the second sidewall towards the distal end of the clamp, and the proximate end of the second sidewall flares outwardly away from the cavity; and
   where the first sidewall has a first sidewall length extending along the first sidewall between the proximate and distal ends that is greater than a second sidewall length of the second sidewall extending along the second sidewall between the proximate and distal ends.

8. A solar panel mounting subassembly, comprising:
   a tube;
   a purlin attached to the tube, the purlin comprising a purlin sidewall with a projection extending outwardly from the sidewall;
   a photovoltaic module comprising a frame that includes an exterior mounting hole;
   a clamp to secure the photovoltaic module to the purlin, the clamp comprising
      a web extending between a first sidewall and a second sidewall at a distal end of the clamp, where the first and second sidewalls are substantially opposing and spaced apart to form a cavity;
      where the web includes a plurality of segments comprising a plurality of radiused segments and first and second opposing gussets located on respective opposing ones of the plurality of radiused segments;
      where the first sidewall includes a through hole and a bendable projection extending obliquely from a plane of the through hole; and
      where the second sidewall includes a rib extending from a proximate end of the second sidewall towards the distal end of the clamp, and the proximate end of the second sidewall flares outwardly away from the cavity.

9. The solar panel mounting subassembly of claim 8, where the proximate end of the second sidewall includes a proximate end segment that flares outwardly from the cavity.

10. The solar panel mounting subassembly of claim 8, where the tube comprises a rotatable torque tube.

\* \* \* \* \*